United States Patent
Lehner et al.

[11] Patent Number: 6,110,435
[45] Date of Patent: *Aug. 29, 2000

[54] METHOD AND DEVICE FOR NITRIC OXIDE REDUCTION IN EXHAUST FUMES

[75] Inventors: Wolfgang Lehner, Esslingen; Martin Teigeler, Stuttgart; Friedrich Wirbeleit, Esslingen, all of Germany

[73] Assignee: DaimlerChrysler AG, Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/076,789

[22] Filed: May 13, 1998

[30] Foreign Application Priority Data

May 13, 1997 [DE] Germany ............... 197 19 998

[51] Int. Cl.⁷ ............... C01B 21/00; B01D 47/00
[52] U.S. Cl. ............... 423/235; 423/210.5; 423/212
[58] Field of Search ............... 423/210.5, 212, 423/235

[56] References Cited

U.S. PATENT DOCUMENTS

| | | | |
|---|---|---|---|
| 4,061,597 | 12/1977 | Goldstein et al. | 252/465 |
| 4,208,386 | 6/1980 | Arand et al. | 423/235 |
| 4,626,417 | 12/1986 | Young | 423/235 |
| 5,296,206 | 3/1994 | Cho | 423/235 |
| 5,809,775 | 9/1998 | Tarabulski et al. | 423/212 |

FOREIGN PATENT DOCUMENTS

| | | |
|---|---|---|
| 0 445 408 A1 | 9/1991 | European Pat. Off. |
| 0 615 777 A1 | 9/1994 | European Pat. Off. |
| 38 30 045 A1 | 3/1990 | Germany |
| 40 38 054 A1 | 6/1992 | Germany |
| 41 26 705 A1 | 2/1993 | Germany |
| 42 00 514 A1 | 7/1993 | Germany |
| 42 03 807 A1 | 8/1993 | Germany |
| 43 08 542 A1 | 9/1994 | Germany |
| 44 04 617 A1 | 8/1995 | Germany |

OTHER PUBLICATIONS

"Mit Harnstoff gegen Stickoxyde," *Technik und Motor*, Dienstag, Jan. 2, 1996, No. 1.

Dagmar Kunz, "Abgasanalytik bei Dieselmotoren mit Anlagen zur selektiven katalytischen Reduktion (SCR) von Stickoxiden," Dissertation, Universitaet Kaiserslautern, Sep. 1996.

Prof. Dr. –Ing. A. Leipertz (Hrzg.), "Motorische Verbrennung—aktuelle Probleme und moderne Lösungsansätze", *Berichte Zur Energie– Und Verfahrenstechnik*, Heft 97.1, Erlangen 1997; a) H. Pitsch et al., "Modellierung der Schadstoffbildung bei der dieselmotorischen Verbrennung," pp. 139–163; b) J. Geiger et al., "Messmethoden für die Entwicklung ottomotorischer Brennverfahren mit innerer Gemischbildung,"pp. 225–244.

*Primary Examiner*—Steven P. Griffin
*Assistant Examiner*—Maribel Medina
*Attorney, Agent, or Firm*—Evenson, McKeown, Edwards & Lenahan, P.L.L.C.

[57] ABSTRACT

A process for reducing nitrogen oxides in the exhaust gas of a combustion device, particularly of an internal-combustion engine, includes melting solid pure urea to obtain a molten product, and adding the molten product to the exhaust gas as the reducing agent for reducing nitrogen oxides. The corresponding device includes a device for the controlled liquefaction of solid pure urea and the injection of the molten product into the exhaust gas.

5 Claims, 1 Drawing Sheet

METHOD AND DEVICE FOR NITRIC OXIDE REDUCTION IN EXHAUST FUMES

BACKGROUND AND SUMMARY OF THE INVENTION

This application claims the priority of German Patent Document No. 197 19 998.4, filed in Germany on May 13, 1997, the disclosure of which is expressly incorporated by reference herein.

The invention relates to a process and a device for reducing nitrogen oxides contained in the exhaust gas of a combustion device by the addition of a reducing agent.

Processes and devices of this type are customary, for example, in motor vehicle engines. The air excess on a diesel engine that is operated in a quality-controlled manner, as well as the lean operation that is frequently used in the case of Otto engines for reducing the fuel consumption, prevent the nitrogen oxides emitted by the engine from being converted by other than catalytic reduction. As a remedy, it is known to add a suitable reducing agent to the exhaust gas to be purified with respect to the nitrogen oxides.

Thus, it is suggested in the Published German Patent Application DE 40 38 054 A1 to evaporate an aqueous urea solution in an evaporator and in the process hydrolyze ammonia and carbon dioxide. The hydrolysis is optionally completed by a hydrolysis catalyst.

The gas mixture of ammonia and water formed by the urea hydrolysis at 140° to 300° C. is injected as the reducing agent into the exhaust gas of a combustion device, such as a motor vehicle combustion engine. By means of a reduction catalyst, a selective catalytic reduction of the nitrogen oxides will then take place.

Furthermore, German Published Patent Application DE 42 03 807 A1 discloses constructing an evaporator as a flow mixer and, as a result, permits a compact construction of the nitrogen oxide reducing device. This reference also discloses adding the aqueous urea solution by means of a corresponding control as a function of the rotational engine speed and of the engine load in order to keep a reduction catalyst free of excessive ammonia. In this case, the urea addition is activated only when the exhaust gas temperature, which is sensed at several points by means of corresponding sensors, is above a definable limit value. However, during the injecting of a urea solution (which is preheated as required) directly into an exhaust gas pipe in front of the reduction catalyst, undesirable reaction products may form. The urea is decomposed by thermolysis, while developing gas, to a remeltable cyanuric acid if it is heated above its melting point. When urea is heated between 130° to 250° C., a sublimation would occur under a partial decomposition to ammonia and the reactive isocyanic acid, while biuret (i.e., carbamylurea), the cyanuric acid and ammelide would remain in the residue. The cyanuric acid and ammelide, as well as possibly additional substances, would be a considerable hindrance for a gasification of the urea because the solid urea would first result in liquid urea and then solid, unmeltable substances would again be formed.

U.S. Pat. No. 5,296,206 discloses the injecting of a reducing agent formed by the evaporation of an aqueous urea solution or ammonia solution into the exhaust gas flow of a combustion device for the purpose of a catalytic, or as an alternative, also non-catalytic reduction of nitrogen oxides contained in the exhaust gas. In the disclosed device, the evaporator is heated by a compressed-air flow which previously had been guided via a heat exchanger situated in the exhaust gas flow and is therefore capable of absorbing exhaust gas heat. The reducing agent injection operation is carried out by a corresponding control as a function of respective relevant operating parameters, such as the exhaust gas flow rate, the exhaust gas temperature and the nitrogen oxide concentration of the exhaust gas.

In European Published Patent Application EP 0 615 777 A1, a process and a device are described for the selective catalytic nitrogen oxide reduction in the exhaust gas of a combustion device, such as an internal-combustion engine. Solid urea is added to the exhaust gas as the reducing agent. In this case, the urea is fed by means of compressed air in the form of microprills, which have a grain diameter of between 10 $\mu$m and 1,000 $\mu$m, and is atomized into the exhaust gas flow. For maintaining the flowability of the hygroscopic urea microprill, special measures are required.

The present invention is based on the technical problem of providing a process and a device of the initially mentioned type by means of which the nitrogen oxides contained in the exhaust gas of a combustion device can be reduced comparatively simply and reliably.

The present invention solves this problem by providing (1) a process comprising melting solid pure urea to form a molten product, and adding the molten product to the exhaust gas as the reducing agent for the reduction of nitrogen oxides; and (2) a device comprising a liquefaction and injection device for heating solid pure urea above its melting temperature to obtain a molten product and for the controlled injection of the molten product into the exhaust gas of the combustion device as a reducing agent for the reduction of nitrogen oxides.

According to the process of the present invention, a molten product is added as the reducing agent for the reduction of nitrogen oxides. The molten product is obtained by the melting of pure urea by means of heating the urea. As in the case of all reducing agent additions based on urea, the ammonia that is formed from the urea is also used as the primary nitrogen oxide reducing agent. By means of the thermal pretreatment of the urea (i.e., its liquefaction), a pyrolysis of urea to ammonia and possibly to isocyanic acid can take place so that the molten product added to the exhaust gas already contains ammonia. By adding this reducing agent in liquid form to the exhaust gas, the known difficulties connected with the evaporation of aqueous urea solutions or the entering of urea in a solid, finely pulverized form are avoided.

According to another embodiment of the present invention, the heating of the pure urea during the melting operation takes place at a temperature of no more than approximately 250° C., preferably at a temperature of between 133° C. and approximately 160° C. At a typical heating rate of, for example, 20° C. per minute, the formation of undesirable urea decomposition products, for example, cyanuric acid from the trimerization process of isocyanic acid, which is promoted by higher temperatures, can therefore be prevented.

A device according to the present invention that is suitable for carrying out the process includes a liquefaction and injection device by means of which the pure urea can be heated in a controlled manner above the melting temperature. The thus obtained molten product can be injected into the exhaust gas flow of the combustion device as the reducing agent for the reduction of nitrogen oxides. For example, in the case of an internal-combustion engine, the injection can take place in the engine's combustion spaces or in an exhaust gas line.

A device according to another embodiment of the present invention is designed for use in the case of an internal-combustion engine and includes a liquefaction and injection device having a heating apparatus, a conveying apparatus and an injection apparatus. The conveying apparatus feeds a quantity of urea, which can be controlled as a function of the engine load and of the rotational engine speed, to the heating apparatus. The injection apparatus carries out the injecting of the molten product provided by the heating apparatus as a function of the engine load, the rotational engine speed and the crank angle of the internal-combustion engine.

In another embodiment of the present invention, the heating apparatus may contain an exhaust gas heat exchanger by means of which heat from a controllable portion of the exhaust gas flow is utilized for the liquefaction of the urea.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
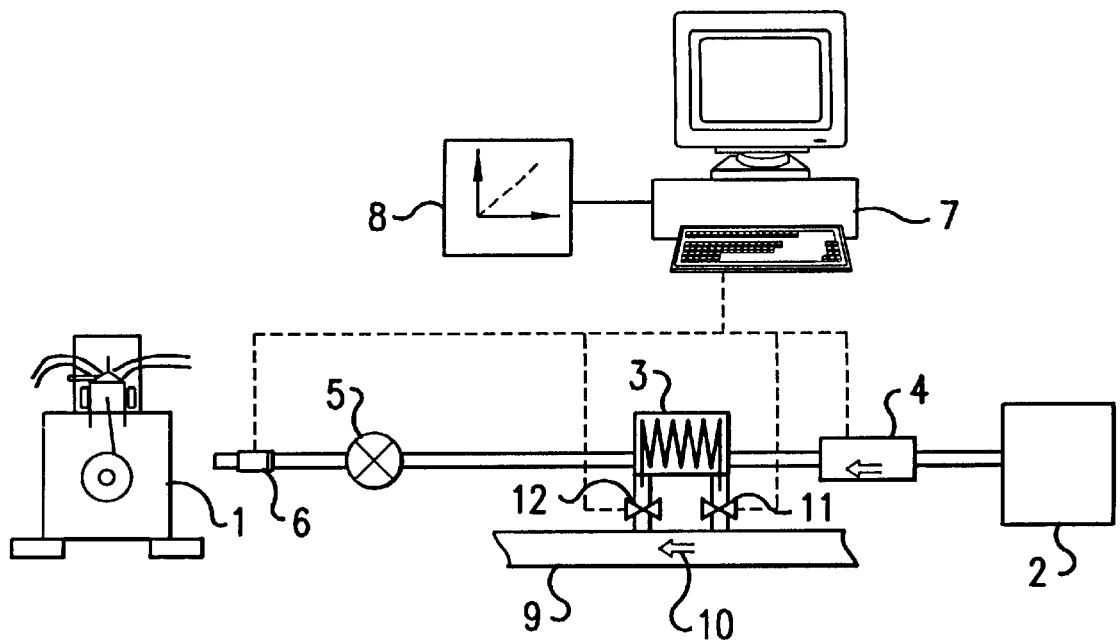
FIG. 1 is a diagram of a motor vehicle engine system including a device for reducing nitrogen oxides contained in the exhaust gas of a motor vehicle internal-combustion engine, with the addition of a molten urea product according to preferred embodiments of the invention.

The arrangement or device illustrated in FIG. 1 is used for reducing nitrogen oxides that are contained in the exhaust gas of a motor vehicle internal-combustion engine by the addition of a molten urea product. For this purpose, the arrangement contains a device (1) for the controlled liquefaction of solid urea that is stored in a crystalline or pulverized form in a urea storage container 2 carried along in the vehicle; and (2) for the injection of the resulting molten product into the internal-combustion engine exhaust gas. In particular, for this purpose, the device has a heating apparatus in the form of an exhaust gas heat transfer device 3, a conveying apparatus in the form of a controllable conveyer spiral 4 and an injection apparatus that consists of a high-pressure injection pump 5 and one or more controllable injection nozzles 6. Furthermore, the liquefaction and injection device contains a control or regulating unit 7, for example, in the form of a personal computer with corresponding peripheral equipment, such as a keyboard, a video screen, and the like. Among other things, a definable characteristic $NO_x$ diagram 8 concerning the relationship of the nitrogen oxide concentration in the engine exhaust gas as a function of the rotational speed and of the load of the engine, which is relevant to the internal-combustion engine system 1, is stored in this unit 7.

The conveyor spiral 4 controlled by the control or regulating unit 7 supplies solid urea to the heat exchanger 3 from the storage tank 2 in a conveyed amount that is a function of the rotational engine speed and the engine load. The heat exchanger 3 can be acted upon by a partial exhaust gas flow that is taken from the exhaust gas flow 10 coming from the engine at a corresponding section 9 of the exhaust gas line of the internal-combustion engine 1. The quantity of exhaust gas guided through the heat exchanger 3 can be controlled by an inlet-side and an outlet-side valve 11, 12 which are both controlled by the control or regulating unit 7. In the heat exchanger 3, heat is transferred from the partial exhaust gas flow to the crystalline or pulverized urea and, as a result, the urea is heated to a definable temperature that is above its melting temperature.

The resulting molten product which, because of the pyrolysis of urea already contains ammonia and possibly isocyanic acid (HNCO), will reach the high-pressure injection pump 5 by which it is injected by way of one or more injection nozzles 6 into the engine exhaust gas. In the case of a selective catalytic nitrogen oxide reduction, when a corresponding reduction catalyst is present, preferred injection points are in front of the inlet side of this catalyst. In the case of a non-catalytic nitrogen oxide reduction, preferred injection points are in the combustion space or spaces of the engine 1, in the combustion space outlet duct of a corresponding cylinder head, or directly in front of the exhaust gas turbine of an exhaust gas turbocharger. At these points, the respective required temperature and flow turbulence conditions exist for effective charging and utilization of the reducing agent.

Figure 2:
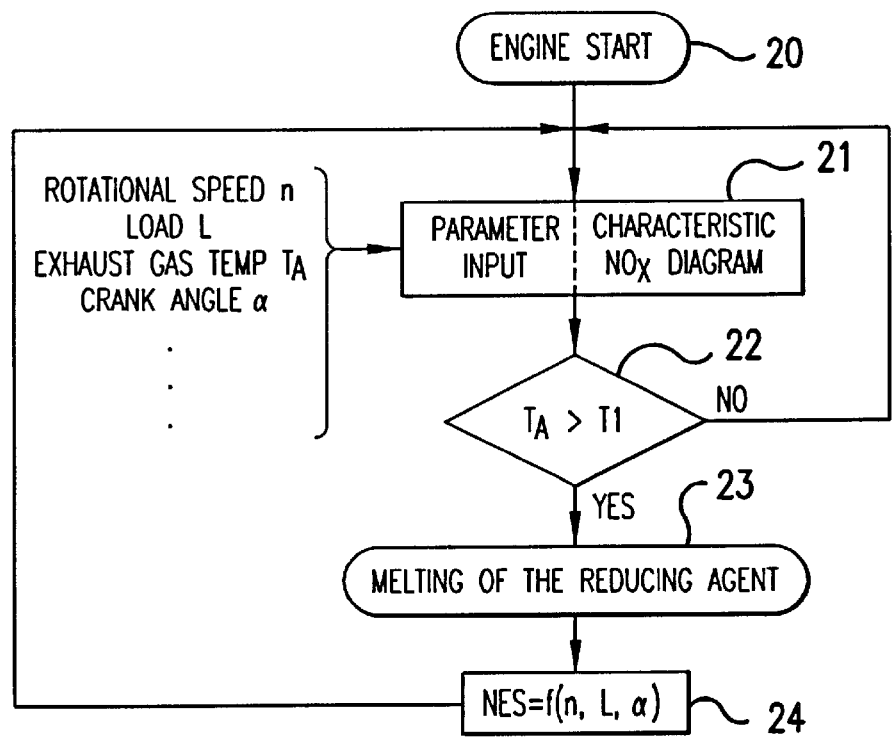
FIG. 2 is a schematic flow chart of operating processes for the system of FIG. 1.

FIG. 2 illustrates the operating sequence, which is preferably implemented by means of the device of FIG. 1, in the form of a flow chart. After a start of the engine (step 20), the control or regulating unit 7 receives the input quantities relevant to the controlling or regulating of the reducing agent addition to the engine exhaust gas, which are detected by way of corresponding conventional sensors. In particular, the quantities are the rotational engine speed n, engine load L, exhaust gas temperature $T_A$ and crank angle α of the engine 1, as well as, depending on the application, additional quantities relevant to the reducing agent addition (step 21). The control or regulating unit 7 determines step 21 by means of the fed information concerning the momentary rotational engine speed n and the momentary engine load L, the momentary nitrogen oxide concentration in the engine exhaust gas by means of the filed characteristic diagram 8. Subsequently, it checks whether the exhaust gas temperature $T_A$ is higher than a given temperature T1 to which the urea is to be heated in the heat exchanger 3 (step 22).

The desired temperature T1 for the molten product obtained by the melting of the solid urea is selected at least as high as the urea melting temperature of 133° C., but no higher than a certain upper limit temperature which, for example, for a typically used heating rate of 20° C. per minute, can amount up to approximately 250° C., but is preferably in the range of approximately 160° C. By controlling or regulating the temperature of the molten urea product to such a temperature range between 133° C. to approximately 250° C., preferably to approximately 160° C., the formation of undesirable products during the urea pyrolysis can be prevented, such as the formation of cyanuric acid ($C_3N_3O_3H_3$) from the trimerization process of isocyanic acid.

As long as the exhaust gas temperature $T_A$ has not exceeded the defined desired temperature T1 of the molten urea product, and the control and regulating unit 7 keeps the spiral conveyor 4 inactive, no reducing agent is added. In this low exhaust gas temperature range, an effective nitrogen oxide reduction reaction would not yet take place. As soon as the exhaust gas temperature $T_A$ has exceeded the desired temperature T1 of the molten urea product, the control or regulating unit 7 activates the addition of reducing agent. First, control or regulating unit 7 activates the melting operation for obtaining the molten urea product to be injected into the exhaust gas (step 23). For this purpose, it presets by way of the conveyor spiral 4 the urea quantity appropriate for the situation and, by way of the valves 11, 12, the partial exhaust gas flow quantity flowing through the heat exchanger 3 and thus the exhaust gas heat required for heating the urea quantity to the defined desired temperature T1. The molten urea product obtained in this manner will then, in a reducing agent after injection operation NES determined by the control or regulating unit 7, be injected at the corresponding points into the exhaust gas flow (step 24) by means of the one or several injection nozzles 6. In this case, the control or regulating unit 7 determines the after injection operation NES with respect to the injection duration and the injection start as a function of the rotational engine speed n, the engine load L and the crank angle a. By means of the continuous observation, that is, the cyclic repetition of the program sequence of FIG. 2, the reducing agent injection is continuously adapted to the respective engine operating situation.

The above-explained embodiment demonstrates that, as the result of the process according to the present invention and the device according to the present invention, a comparatively simple and reliable reducing agent addition is implemented for the reduction of nitrogen oxides in a combustion exhaust gas. It is understood that the claimed invention comprises variants of the illustrated embodiment. Thus, for example, instead of or in addition to the exhaust gas heat exchanger, an exhaust-gas-independent exchanger, for example, electric heating apparatus can be provided for melting the urea. Further, depending on the application, the illustrated control or regulating unit can be designed only as a control device or only as a regulating device, for example, with fed-back information concerning the nitrogen oxide concentration in the outlet-side end area of an engine exhaust gas line. The object of the invention is naturally not limited to a use in motor vehicle engines but, in the same manner, can also be applied to stationary internal-combustion engines and other nitrogen-oxide emitting combustion devices.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for reducing nitrogen oxides contained in an exhaust gas of a combustion device, consisting essentially of:

melting solid, pure urea to form a molten product, and adding the molten product to the exhaust gas as a reducing agent for the reduction of nitrogen oxides, wherein the melting comprises heating to a temperature of no more than approximately 250° C.

2. The process according to claim 1, wherein said combustion device is an internal-combustion engine.

3. The process according to claim 1, wherein said melting comprises heating to a temperature of no more than approximately 160° C.

4. The process according to claim 1, wherein said melting comprises heating to a temperature of between 133° C. and 160° C.

5. The process according to claim 1, wherein said melting comprises heating by a control or regulating unit.

* * * * *